United States Patent
Hara (10) Patent No.: US 8,504,901 B2
(45) Date of Patent: Aug. 6, 2013

(54) APPARATUS, METHOD, AND COMPUTER PROGRAM PRODUCT FOR DETECTING EMBEDDED INFORMATION

(75) Inventor: Takayuki Hara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 280 days.

(21) Appl. No.: 13/003,706

(22) PCT Filed: Jun. 26, 2009

(86) PCT No.: PCT/JP2009/062176
§ 371 (c)(1),
(2), (4) Date: Jan. 11, 2011

(87) PCT Pub. No.: WO2010/004934
PCT Pub. Date: Jan. 14, 2010

(65) Prior Publication Data
US 2011/0119555 A1    May 19, 2011

(30) Foreign Application Priority Data

Jul. 11, 2008  (JP) ................................ 2008-180975
Apr. 10, 2009  (JP) ................................ 2009-095740

(51) Int. Cl.
*G06F 11/00*  (2006.01)
*H03M 13/00*  (2006.01)

(52) U.S. Cl.
USPC ......................................... 714/798; 714/746

(58) Field of Classification Search
USPC ........................... 714/755, 776, 810; 382/100
See application file for complete search history.

(56) References Cited

U.S. PATENT DOCUMENTS

| | | | | |
|---|---|---|---|---|
| 7,212,649 | B2* | 5/2007 | Watanabe et al. | 382/100 |
| 7,992,074 | B2* | 8/2011 | Katou et al. | 714/776 |
| 8,103,049 | B2* | 1/2012 | Petrovic et al. | 382/100 |
| 2003/0021442 | A1 | 1/2003 | Suzaki | |

FOREIGN PATENT DOCUMENTS

| | | |
|---|---|---|
| JP | 2000 187441 | 7/2000 |
| JP | 2001 333267 | 11/2001 |
| JP | 2002 10058 | 1/2002 |
| JP | 2004 112608 | 4/2004 |
| JP | 2004 221715 | 8/2004 |
| JP | 2004 312568 | 11/2004 |
| JP | 2006 135922 | 5/2006 |
| JP | 3942759 | 4/2007 |
| JP | 2008 54059 | 3/2008 |
| JP | 2009 76968 | 4/2009 |

OTHER PUBLICATIONS

Extended European Search Report issued Dec. 22, 2011, in European Patent Application No. 09794379.9.
International Search Report issued Sep. 1, 2009 in PCT/JP09/62176 filed Jun. 26, 2009.

* cited by examiner

*Primary Examiner* — Shelly A Chase
(74) *Attorney, Agent, or Firm* — Oblon, Spivak, McClelland, Maier & Neustadt, L.L.P.

(57) ABSTRACT

A control unit extracts partial information containing embedded information from a partial area of a content, and controls decoding of the embedded information. A decoding unit performs a decoding process of decoding a plurality of code words contained in the embedded information from the partial information. When the decoding process is successfully performed, the decoding unit notifies the control unit of completion of the decoding process so that each of the control unit and the decoding unit perform a parallel processing in an asynchronous manner. The control unit repeatedly extracts the partial information and sends extracted partial information to the decoding unit until the decoding process is successfully performed.

10 Claims, 8 Drawing Sheets

APPARATUS, METHOD, AND COMPUTER PROGRAM PRODUCT FOR DETECTING EMBEDDED INFORMATION

TECHNICAL FIELD

The present invention relates to a technology for extracting information embedded in electronically-created contents.

BACKGROUND ART

In recent years, a digital watermark technology for embedding and extracting information in and from content such as image or video is actively developed to achieve a purpose such as copyright protection, tracing, forgery prevention, tamper detection, or addition of meta-information for image retrieval. The digital watermark technology enables embedding of information in an image, so that a detectability of the information embedded in the image (hereinafter, referred to as "embedded information") can be decreased, resulting in protection of the embedded information. On the other hand, a technique of extracting the embedded information with high accuracy is a key for success of an information embedding technology including the digital watermark technology.

Conventionally, a technology for increasing the detectability of the embedded information by assuring robustness against the decreased detectability of the embedded information has been developed. For example, Japanese Patent Application Laid-open No. 2000-216983, Japanese Patent Application Laid-open No. 2001-333267, and Japanese Patent Application Laid-open No. 2006-135922 disclose a technology for redundantly embedding information. Furthermore, a technology for applying embedded information as an error correction code is disclosed in, for example, Japanese Patent Application Laid-open No. 2002-010058, Japanese Patent Application Laid-open No. 2000-187441, and Japanese Patent Application Laid-open No. 2004-221715.

In the conventional technologies disclosed above, embedded information is embedded in an image through redundant recording thereof so that the detectability of digital watermark can be more decreased, resulting in increasing security of the digital watermark. However, because the embedded information is redundantly recorded, when the embedded information is to be extracted from the image, larger number of pieces of information than desired pieces of information to be extracted need to be detected to decode smaller amount of embedded information than redundantly-recorded information. Thus, there is a problem that, in processing of both embedding and extracting information, image processing cannot be performed efficiently in terms of calculation amounts.

The present invention has been made to solve the above problems in the conventional technology and it is an object of the present invention to increase a processing speed when information is extracted from a content in which embedded information is redundantly embedded.

DISCLOSURE OF INVENTION

According to one aspect of the present invention, there is provided an apparatus for detecting embedded information redundantly embedded in a content. The apparatus includes a control unit that extracts partial information containing the embedded information from a partial area of the content, and controls decoding of the embedded information and a decoding unit that performs a decoding process of decoding a plurality of code words contained in the embedded information from the partial information. When the decoding process is successfully performed, the decoding unit notifies the control unit of completion of the decoding process so that each of the control unit and the decoding unit perform a parallel processing in an asynchronous manner. The control unit repeatedly extracts the partial information and sends extracted partial information to the decoding unit until the decoding process is successfully performed.

Furthermore, according to another aspect of the present invention, there is provided a method of detecting embedded information redundantly embedded in a content. The method includes first extracting including extracting partial information containing the embedded information from a partial area of the content; first decoding including performing a decoding process of decoding a plurality of code words contained in the embedded information from the partial information; second extracting including repeatedly extracting the partial information containing identical embedded information until the decoding process is successfully performed; second decoding including decoding, when a plurality of pieces of partial information is extracted at the second extracting, code words by performing a statistical processing on the pieces of partial information; notifying completion of the decoding process when the code words are successfully decoded; and performing a parallel processing of a process of extracting the partial information and the decoding process in an asynchronous manner.

Moreover, according to still another aspect of the present invention, there is provided a computer program product including a computer-usable medium having computer-readable program codes embodied in the medium for detecting embedded information redundantly embedded in a content. The program codes when executed cause a computer to execute first extracting including extracting partial information containing the embedded information from a partial area of the content; first decoding including performing a decoding process of decoding a plurality of code words contained in the embedded information from the partial information; second extracting including repeatedly extracting the partial information containing identical embedded information until the decoding process is successfully performed; second decoding including decoding, when a plurality of pieces of partial information is extracted at the second extracting, code words by performing a statistical processing on the pieces of partial information; notifying completion of the decoding process when the code words are successfully decoded; and performing a parallel processing of a process of extracting the partial information and the decoding process in an asynchronous manner.

BEST MODE(S) FOR CARRYING OUT THE INVENTION

Exemplary embodiments of the present invention are described in detail below with reference to the accompanying drawings. However, the present invention is not limited to these exemplary embodiments.

Figure 1:
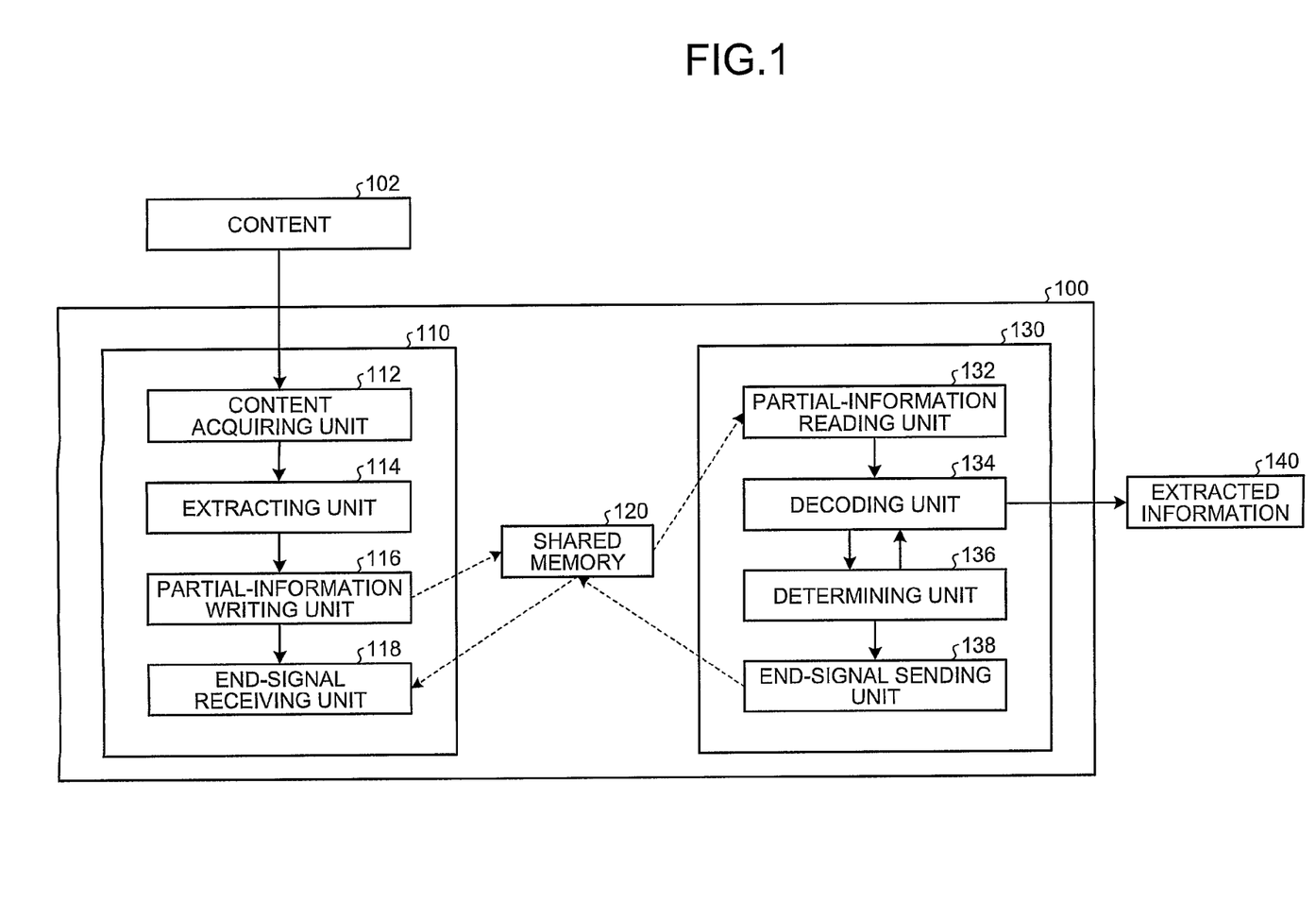
FIG. 1 is a block diagram of a functional configuration of an embedded-information detecting apparatus according to an embodiment of the present invention.

FIG. 1 is a block diagram of a functional configuration of an embedded-information detecting apparatus 100 according to an embodiment of the present invention. The embedded-information detecting apparatus 100 can be configured as a personal computer, a multifunction copier as a so-called MFP (multifunction printer), and the like. The embedded-information detecting apparatus 100 is provided with a single-core or a multi-core CPU (central processing unit), a RAM that provides a work area used for executing application programs, and a ROM in which BIOS and an initial setup code are registered. The embedded-information detecting apparatus 100 is also provided with, but not limited to, a hard disk drive and an external storage device used with a CD-ROM, a DVD, and the like to store therein content data to be subjected to image processing or data obtained after performing image processing.

The embedded-information detecting apparatus 100 includes, in the embodiment, a decoding control unit 110 that functions as a control unit and a decoding processing unit 130 that functions as a decoding unit. The embedded-information detecting apparatus 100 acquires a content 102 containing an image and sends the content 102 to the decoding control unit 110. The content 102 can be acquired through various methods. For example, if the embedded-information detecting apparatus 100 is provided with an image reader, the content 102 can be acquired via the image reader. Alternatively, the embedded-information detecting apparatus 100 can read the content 102 stored in a recording medium attached to the external storage device and send the content 102 to the decoding control unit 110. If an image is downloaded from a web page, the image loaded in a buffer memory managed by a browser can be used as a processing object.

The decoding control unit 110 includes a content acquiring unit 112, an extracting unit 114 that acquires embedded information from the content 102, and a partial-information writing unit 116. The decoding control unit 110 sends a piece of partial information used for decoding embedded information among pieces of partial information extracted from the content 102 to the decoding processing unit 130 via a shared memory 120, and requests the decoding processing unit 130 to perform a decoding process. The decoding control unit 110 also includes an end-signal receiving unit 118. The end-signal receiving unit 118 receives a notice of completion of decoding from the decoding processing unit 130 via the shared memory 120, so that the decoding processing unit 130 ends the decoding process and outputs extracted information 140 as a decoding result. The extracted information 140 can be sent to an external apparatus to control other apparatuses, or can be used for controlling modules (not shown) of the embedded-information detecting apparatus 100, such as print control, record control, and registration of content acquisition log. While, in the embodiment, the decoding control unit 110 and the decoding processing unit 130 are configured to send and receive the partial information or various notices to and from each other via the shared memory 120, the partial information or the various notices can be sent and received without using the shared memory 120 as will be described later in another example of the embodiment.

The partial-information writing unit 116 sends partial information to the shared memory 120. The shared memory 120 buffers the partial information. The shared memory 120 is implemented with a RAM and the like, and used for sending the partial information to the decoding processing unit 130 in order of arrival of the partial information in the shared memory 120 based on the first-in first-out method. With this view, the shared memory 120 is preferably configured as a FIFO buffer or the like. Furthermore, if configured as software, the shared memory 120 can be implemented with queue class and the like. The shared memory 120 receives a decoding end signal indicating a completion of a decoding process when the decoding processing unit 130 has successfully performed decoding. Consequently, the shared memory 120 discards successive partial information to save a memory capacity thereof.

The decoding processing unit 130 acquires the partial information and attempts to decode embedded information that may be contained in the partial information. When having successfully performed decoding, the decoding processing unit 130 performs processing of outputting the embedded information as the extracted information 140. The decoding processing unit 130 includes a partial-information reading unit 132 and a decoding unit 134. The partial-information reading unit 132 reads the partial information from the shared memory 120 and sends the partial information to the decoding unit 134. The decoding unit 134 divides the partial information into blocks, defines the blocks, and performs codeword identification processing in units of blocks. In the embodiment, the partial information is defined as a collection of a plurality of blocks. In other words, a collection of a predetermined number of blocks constitutes the partial information. In the partial information, a code word is embedded in each of the blocks. Furthermore, in the embodiment, an identification value is assigned to each of the blocks. Thus, a code can be decoded by arranging the code words acquired from the blocks according to a predetermined rule by reference to the identification values. Processing preformed by the decoding unit 134 will be described in detail later.

The decoding processing unit 130 also includes a determining unit 136 and an end-signal sending unit 138. The determining unit 136 determines whether the decoding unit 134 has successfully decoded a code. When determining that decoding has been successfully performed, the determining unit 136 generates a decoding success signal notifying a successful end of decoding, and sends the decoding success signal to the end-signal sending unit 138. The end-signal sending unit 138 receives the decoding success signal, generates a decoding end signal, sends the decoding end signal to the end-signal receiving unit 118 of the decoding control unit 110 via the shared memory 120, and ends the decoding process. When the decoding has been successfully performed, the determining unit 136 aligns the code words in a predetermined sequence and outputs the code words as the extracted information 140.

The decoding control unit 110 and the decoding processing unit 130 shown in FIG. 1 can be implemented as software modules in the embedded-information detecting apparatus 100. The decoding control unit 110 and the decoding processing unit 130 can also be integrally implemented as an ASIC (Application Specific Integrated Circuit) in consideration of a processing speed. Furthermore, the decoding control unit 110 and the decoding processing unit 130 can be selectively implemented as appropriate in consideration of device cost, performance of a CPU for parallel processing, memory capacity, and the like. The components described above can be realized on a computer by loading computer-executable programs on a CPU and a memory and executing software to cause hardware to operate.

Figure 2:
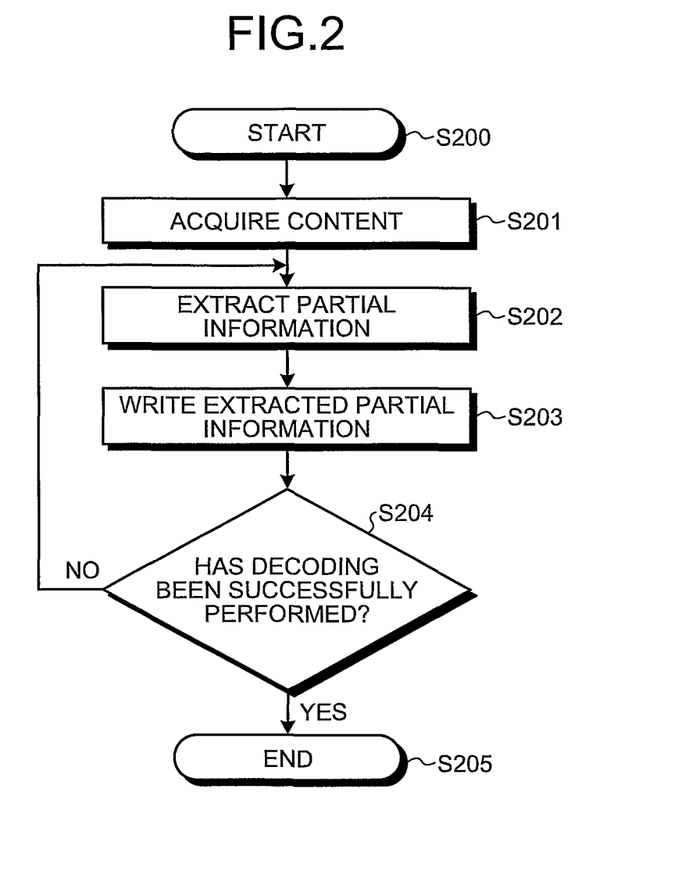
FIG. 2 is a flowchart of a process performed by a decoding control unit according to the embodiment.

FIG. 2 is a flowchart of a process performed by the decoding control unit 110 according to the embodiment. The process shown in FIG. 2 starts at Step S200. The content acquiring unit 112 acquires the content 102 at Step S201. Examples of the content 102 to be acquired include an image acquired via the image reader, an image acquired via a network, and an image acquired from a recording medium attached to the external storage device.

In the process shown in FIG. 2, at Step S202, the extracting unit 114 performs area recognition on the acquired content 102, and extracts a plurality of pieces of partial information corresponding to areas containing embedded information from the content 102. The partial information is defined as a collection of a plurality of blocks. Each of the blocks contains a predetermined number of pixel bits. The identification value is assigned to each of the blocks according to a single encoding method for each piece of the partial information.

At Step S203, the partial-information writing unit 116 writes the extracted partial information in the shared memory 120 for use by the decoding processing unit 130. At Step S204, the end-signal receiving unit 118 determines whether it has received a decoding end signal. When, at Step S204, the end-signal receiving unit 118 determines that it has received the decoding end signal (Yes), process control ends at Step S205. On the other hand, when, at Step S204, the end-signal receiving unit 118 has not received the decoding end signal (No), process control returns to Step S202, and the same processes are repeated by the extracting unit 114 to extract successive partial information at Step S202 and by the partial-information writing unit 116 to write the extracted partial information in the shared memory 120 at Step S203 until the end-signal receiving unit 118 receives the decoding end signal.

Figure 3:
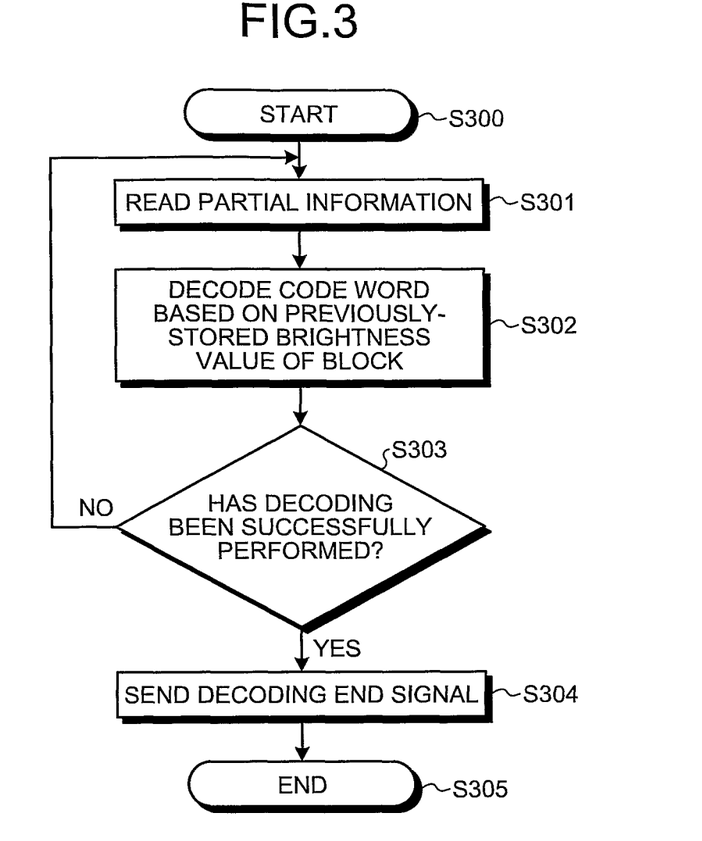
FIG. 3 is a flowchart of a decoding process performed by a decoding processing unit according to the embodiment.

FIG. 3 is a flowchart of a decoding process performed by the decoding processing unit 130 according to the embodiment. The process shown in FIG. 3 starts at Step S300. The partial-information reading unit 132 reads, from the shared memory 120, the partial information that has been registered first in the shared memory 120. At Step S302, the decoding unit 134 identifies pixel bits contained in blocks corresponding to the read partial information, and calculates, for example, an average brightness among pieces of color data of the pixel bits by reading out the same number of B-values that correspond to brightness data of HSB as the pixel bits. The reason the average brightness is used is that hue data of the pixel bits largely fluctuates according to three primary colors depending on hue to be reproduced in the blocks, and thus does not give a preferable index value.

After the average brightness is calculated, at Step S303, the determining unit 136 determines whether decoding has been successfully performed. When the decoding has been successfully performed at Step S303 (Yes), the end-signal sending unit 138 generates the decoding end signal and sends the decoding end signal to the decoding control unit 110 via the shared memory 120 at Step S304, and then process control ends at Step S305. On the other hand, when, at Step S303, the decoding has not been successfully performed (No), process control returns to Step S301, and the process by the partial-information reading unit 132 to read successive partial information from the shared memory 120 and the decoding process at Step S302 are repeated until decoding is successfully performed.

In the embodiment, a successful end of decoding means that a code word is completely decoded. When a code is an error correction code, the successful end of decoding means that error correction has been successfully performed and a code word is completely reproduced. In the embodiment, the decoding control unit 110 and the decoding processing unit 130 can operate in parallel and in an asynchronous manner. Therefore, functional processing units of both the decoding control unit 110 and the decoding processing unit 130 can end operations when the decoding process has been successfully performed. Furthermore, a code can be reproduced by performing the decoding process only on partial information for which decoding has been successfully performed first without performing the decoding process over the entire image. Thus, parallel processing can be performed, and embedded information can be extracted through a process of extracting minimum partial information and a decoding process on the minimum partial information. As a result, a processing time can be shortened.

In the embodiment, the asynchronous manner means that each of the decoding control unit 110 and the decoding processing unit 130 performs processing without being affected by the operational state of the other one. When the decoding unit 134 has successfully performed decoding, the decoding control unit 110 and the decoding processing unit 130 are synchronized with each other and caused to end processing simultaneously. The parallel processing by the decoding control unit 110 and the decoding processing unit 130 will be described in detail later.

The decoding process at Step S302 is described in detail below. In the following example, explanation is given assuming that an image as a processing object is divided into blocks, a predetermined number of the blocks constitute a medium block, the medium block constitute partial information as a unit of read, a code word is embedded in each block through modulation of brightness values, and a code word is decoded based on an average of the brightness values.

Figure 4:
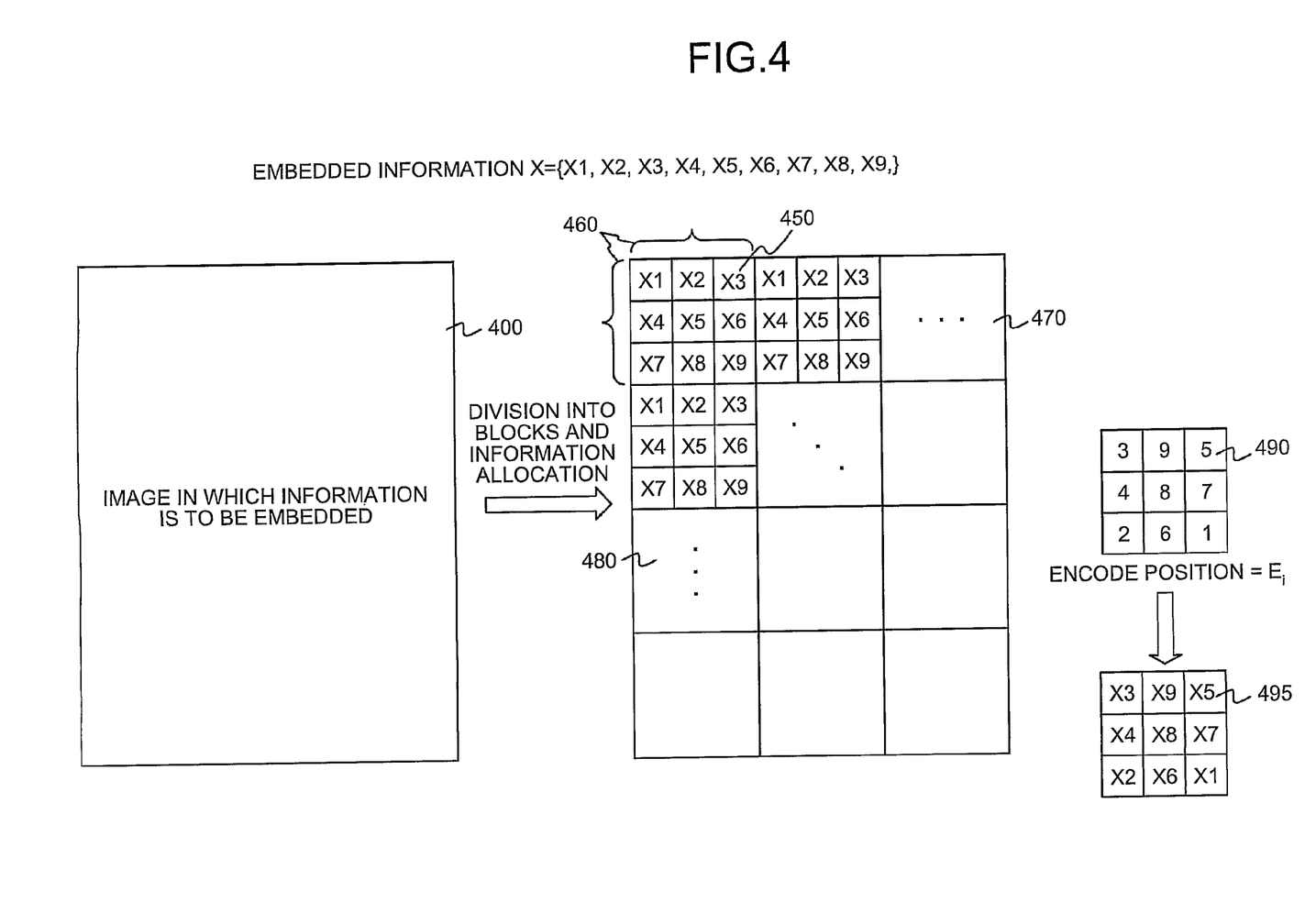
FIG. 4 is a schematic diagram of an example of division of an image into blocks and encoding of embedded information.

An outline of a process of embedding and extracting information is described below. FIG. 4 is a schematic diagram of an example of division of an image 400 into blocks and encoding of embedded information. In the example shown in FIG. 4, the embedded information contains 9 bits of code words, and each of the code words is indicated by $x_i$ ($x_i$ is binary data corresponding to either 1 or 0). In the code word $x_i$, a suffix is used as an identification value for identifying the code word. The image 400 is contained in a content in which the code word $x_i$ is to be embedded. The image 400 is divided into blocks, and a collection of some of the blocks constitutes, for example, a medium block 460, a medium block 470, and a medium block 480. In the example shown in FIG. 4, each of the medium blocks contains 9 blocks, and a code word is assigned to each of the blocks. Besides, an encode position $E_i$ is assigned to each of the blocks in the medium block such that the code word $x_i$ is embedded in a corresponding encode position $E_i$.

In the example shown in FIG. 4, the code word $x_i$ is embedded according to the encode position $E_i$ in the medium block. Regarding embedded data 450 shown in FIG. 4, the encode position $E_i$ is set in such a manner that the identification value is set to i=1 at the upper left corner, is incremented to i=3 toward a right end of the figure within the same row, and is set to i=4, 5, 6 from the left end to the right end in the successive row. In the embedded data 450, the code word $x_i$ is arrayed according to the identification values. In the example shown in FIG. 4, a code has a code length of 9 bits represented by i=1 to i=9. Thus, in the embodiment, a medium block containing n×n blocks (n is a positive integer) can employ a code length of $n^2$ bits. It is also possible to use a medium block in a rectangular shape containing h×k blocks (h and k are positive integers). A method of encoding a code word is not limited to this example. For example, the code word $x_i$ can be assigned to each block by using random number generation and the like, as appropriate.

FIG. 4 also illustrates another example of the encode position in the medium block to be used with another method of encoding a code word. Regarding an encode position 490 of this example, the encode positions $E_i$ to which the code words $x_i$ are assigned are scrambled in the medium block by using a random number generation with unique numbers from 1 to $n^2$ as a method of encoding the code word $x_i$. The code word $x_i$ is embedded in the encode position $E_i$ identified by the same suffix. Embedded data 495 obtained by embedding the code word $x_i$ is also shown in FIG. 4. In the embedded data 495, the code words $x_i$ are also arrayed in a scrambled manner. Thus, as in the case of the encode position 490, by assigning the identification values to the blocks of the medium block by using rnd( ) function and the like, it is possible to increase security of the embedded information against decoding.

A process of superimposing the code word $x_i$ as embedded information by performing brightness modulation using a brightness of a block as characteristic amount is described below. The brightness value of a block to which the code word of 0 is assigned is increased by a predetermined amount, while the brightness value of a block to which the code word of 1 is assigned is decreased by a predetermined amount. For example, when brightness data is set based on 256 tones, the brightness value of a block can be increased or decreased in a proper proportion to an average brightness of all blocks. It is applicable to determine, though not so limited, a set value ΔB by the following Equation (1) with respect to an average brightness $B_{av}$.

$$\Delta B = (-1)^{x_i} \times A \times \log_{10} B_{av} \quad (1)$$

In Equation (1), A is a positive integer to give a proper modulation strength, which corresponds to an increase in brightness when the code word $x_i$=0 and to a decrease in brightness when the code word $x_i$=1. The embedding method described above is by way of example only, and, it is not limited to use of Equation (1) as long as characteristic amount can be modulated properly.

In a process of decoding a code word from an image in which the code word (information) is embedded in the above-described manner, an average of brightness values of blocks is calculated, and, when the average is equal to or smaller than a set threshold $T_{LO}$=α, it is determined that the code word=0 while when the average is equal to or larger than a set threshold $T_{HI}$=β, it is determined that the code word=1, so that the code word can be decoded. The thresholds described above can be appropriately set depending on a condition of brightness modulation. The thresholds can also be changed depending on the average of the brightness values. For example, the thresholds can be set appropriately based on characteristics of an image scanner, such as scanning pitch fluctuation, resolution, dither patter, or image compression scheme, in consideration of tolerance of a boundary area between the code word of 0 and the code word of 1.

If α<$B_{av}$<β is satisfied by the detected value $B_{av}$, there may be a case in which it is not preferable to directly determine a code word depending on a condition of an image. Therefore, an error range to be applied to such a case is provided. If, for example, a tone pattern used for generating embedded information is prepared in advance by reference to identification results of other blocks at corresponding positions in other pieces of partial information so that accuracy of decoding of the code word can be enhanced, it is possible to calculate an integrated average of brightness values of the blocks at the corresponding positions in a plurality of pieces of partial information. With a use of the integrated average, it is possible to enhance the accuracy of decoding of the code word.

In the embodiment, when the detected value $B_{av}$ is in the error range, successive partial information is read out to take a moving average of the value $B_{av}$. Then, a code word is identified based on the value $B_{av}$ corresponding to a resultant first value exceeding the error range. Subsequently, the decoding success signal is generated and the decoding process ends. In this case, the extracted information 140 is generated by decoding the decoded code through a method according to the encoding method, and is to be subjected to successive processing. For example, when {123}, {456}, and {789} are encoded in a medium block in that order from a block on the left end to a block on the right end of the figure, the code word $x_i$ at the encode position identified by $E_i$ is acquired, and a code {$x_1, x_2, \ldots, x_8$, and $x_9$} is decoded.

In another example, an average of brightness values of blocks at corresponding positions in a plurality of pieces of partial information is examined, and when an average in the error range is detected, successive partial information is read out to perform the decoding process. If the average of the brightness values of the blocks successively results in a certain code word for a predetermined number of times, the value corresponding to the successive code words can be identified as a decoding result just after the last identification process among identification processes performed for the predetermined number of times. In the embodiment, if the first value of the average is not in the error range, the decoding process can be completed through minimum steps, and, if the first value of the average is in the error range, the code word $x_i$ can be identified by the decoding process through minimum steps with use of occurrence frequency or occurrence rate of other pieces of partial information.

An error detection method can be selectively employed depending on, for example, specific implementation scheme, use purpose, or image characteristics of the embedded-information detecting apparatus 100. The embedded-information detecting apparatus 100 can be configured to implement the above-described both error detection methods such that it can select either one as appropriate.

Figure 5:
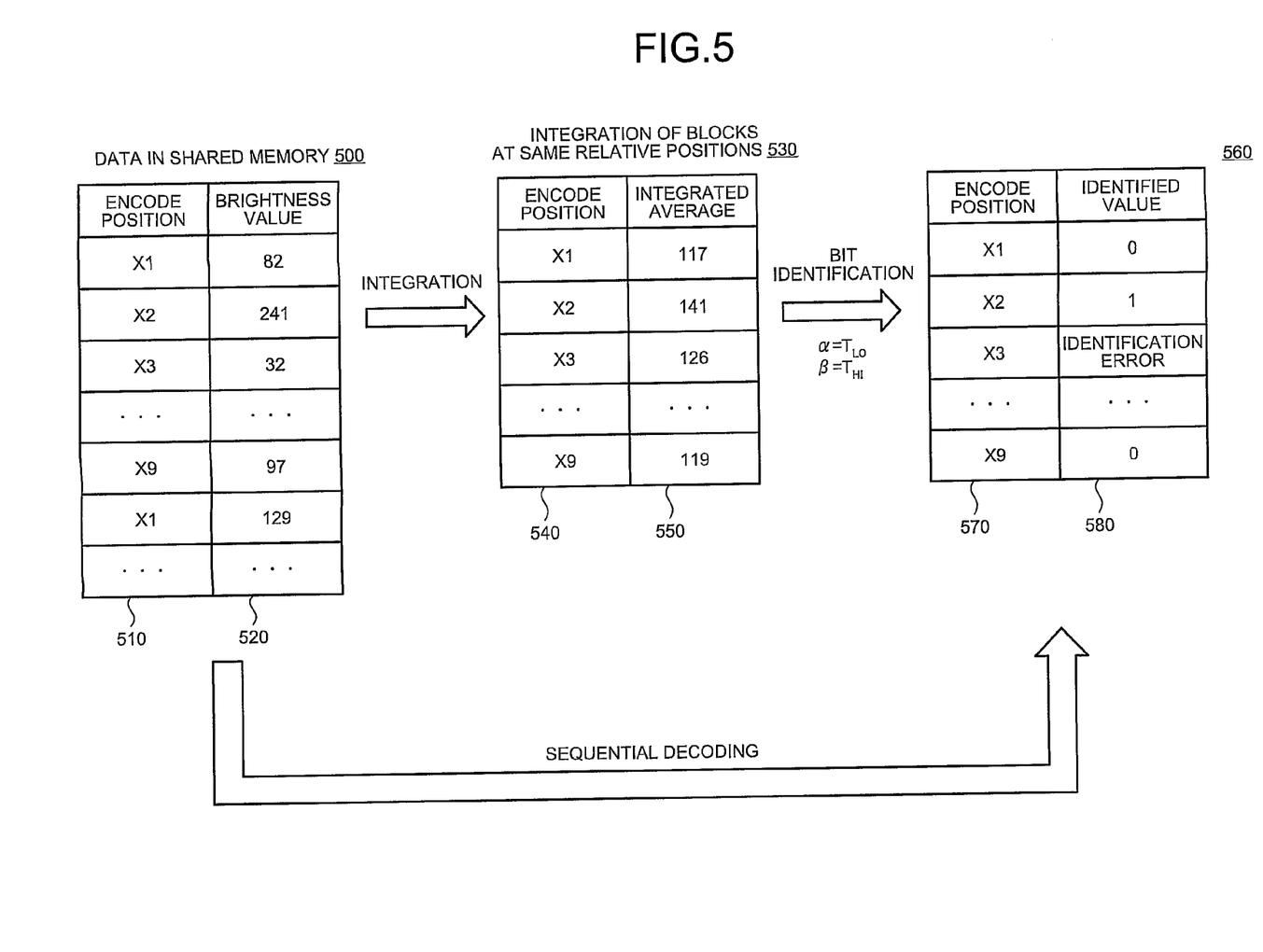
FIG. 5 is a schematic diagram for explaining a decoding process of decoding embedded information in a block based on a data structure of the block according to the embodiment.

FIG. 5 is a schematic diagram for explaining a decoding process of decoding embedded information in a block based on a data structure of the block according to the embodiment. As shown in FIG. 5, the decoding processing unit 130 continuously reads pieces of partial information from the shared memory 120 and decodes code words from blocks contained in the partial information as a processing object until a determination result indicates that the decoding has been successfully performed. FIG. 5 illustrates data structure 500 as a decoding result of the code word $x_i$ stored in the shared memory 120.

In the shared memory 120, an encode position 510 for each block is set according to the identification value i for each piece of partial information, and a brightness value 520 represented by, for example, 256 tones is registered in association with the encode position 510. The partial-information reading unit 132 performs data readout of the code $x_i$, that is, a series of $x_1$ to $x_9$ as one data set in the embodiment, from the shared memory 120. The decoding unit 134 takes a moving average of brightness values of identical blocks to integrate the brightness values corresponding to the same encode positions, and registers an integrated average as a parameter, until a determination result indicates that the decoding has been successfully performed.

FIG. 5 also illustrates integrated average data 530. The integrated average data 530 contains a column 540 in which the encode position of the block is registered and a column 550 in which the integrated average corresponding to a moving average value of the brightness values of the blocks at the encode positions registered in the column 540 is registered. As an example of a calculation of the integrated average, the integrated average for each set of blocks is calculated, a value of the integrated average at each encode position is compared with thresholds α and β, and a bit value of a code word is identified. In the example shown in FIG. 5, it is assumed that α=120 and β=136, and a result of bit identification for a code word is generated as code-word data structure 560.

In the code-word data structure 560, an encode position is registered in a column 570 and an identified value of a code word corresponding to the encode position registered in the column 570 is registered in a column 580. More particularly, in FIG. 5, identification error (decoding error) is set as the identification value of the code word at the encode position of i=3. In the first example of the code-word identification process, the process is performed until the last piece of partial information, and when an identification result indicates the decoding error, successive processes are halted as a result of the decoding error as the identification error of the code word.

In the second example of the code-word identification process shown in FIG. 5, the decoding processing unit 130 reads out a brightness value for each partial information from the shared memory 120, generates a code word for every reading of the brightness value, and counts the number of times of acquisition of the code words by using a counter. When detecting an encode position at which a code word is not identified, the decoding processing unit 130 reads out the partial information and generates code words until identical code words are successively acquired for a predetermined number of times. If it is determined that the identical code words are not successively acquired for the predetermined number of times as a result of the process, a code words is identified for each encode position as in the code-word data structure 560 shown in FIG. 5. Particularly, as shown in the code-word data structure 560, the decoding error as the identification error is registered for the encode position of i=3 as a result of determination that the identical code words are not successively acquired for the predetermined number of times. Both in the first and the second example, when the decoding error occurs, the extracted information 140 is not output and the successive processes are halted.

Figure 6:
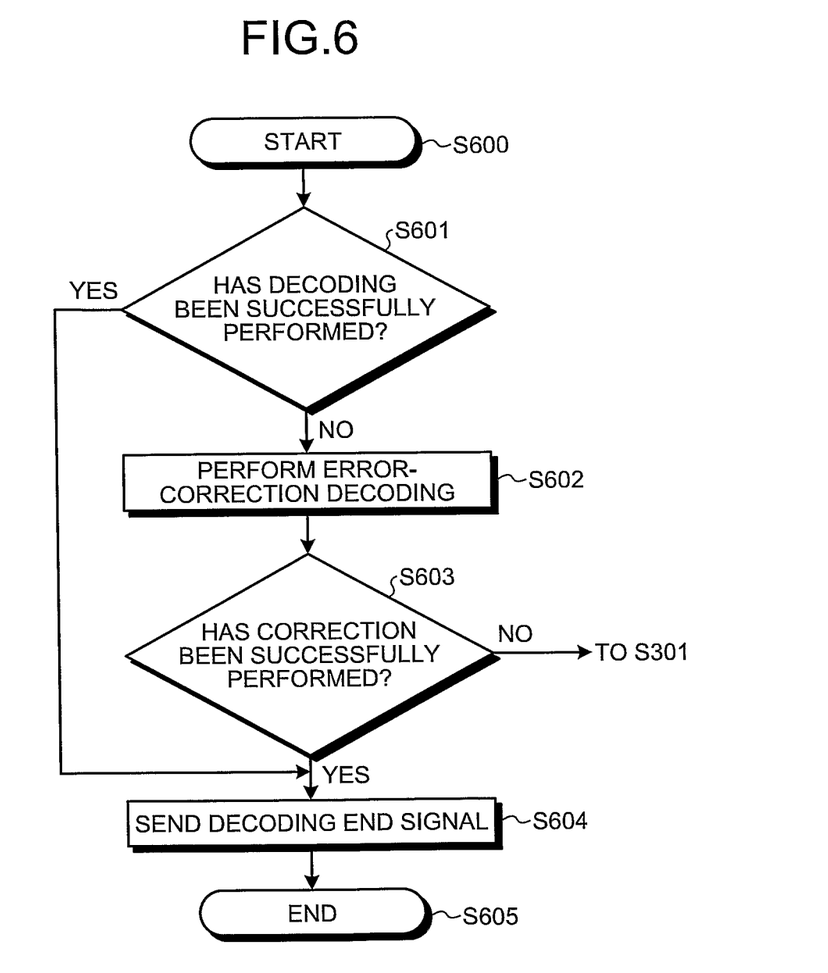
FIG. 6 is a flowchart of an operation of an error-correction decoding process performed by a decoding unit according to the embodiment.

FIG. 6 is a flowchart of an error-correction decoding process performed by the decoding unit 134 according to the embodiment. The process shown in FIG. 6 corresponds to the processes at Steps S302 to S304 shown in FIG. 3.

The process shown in FIG. 6 starts at Step S600. At Step S601, the determining unit 136 determines whether the decoding process has been successfully performed based on a result whether there is a block for which the decoding error is registered. When it is determined that there is the block for which the decoding error is registered and thus determined that the decoding process has not been successfully performed (No), the decoding unit 134 performs a process of decoding an error correction code at Step S602.

At Step S603, the determining unit 136 determines whether the decoding has been successfully performed based on a result whether the error correction has been successfully performed. When the error correction has been successfully performed (Yes), the determining unit 136 causes the decoding unit 134 to output the extracted information 140. Then, at Step S604, the decoding unit 134 activates the end-signal sending unit 138, and causes the end-signal sending unit 138 to generate the decoding end signal and send the decoding end signal to the end-signal receiving unit 118 via the shared memory 120.

On the other hand, when the decoding error is not detected at Step S601 (Yes), process control proceeds to Step S604 at which the end-signal sending unit 138 sends the decoding end signal, and then the decoding process ends (Step S605). As another example of the decoding process, it is possible to check, when the decoding process has been successfully performed, occurrence of an error by decoding the error correction code.

On the other hand, when, at Step S603, the error correction has not been successfully performed (No), process control returns to Step S301, at which successive partial information is read.

The error-correction decoding process performed at Step S602 is described below. When detecting a specific block in the code-word data structure 560 shown in FIG. 5, that is, a block in which a flag or an identification value indicating the identification error is registered in a specific encode position, the decoding unit 134 calls a module for the error-correction decoding process and executed the error-correction decoding process. Examples of the module for the error-correction decoding process include a decoding using a syndrome, a bounded distance decoding, and Viterbi decoding. In the embodiment, an example in which a code of low bits given by $n^2$ is decoded by Viterbi decoding is explained.

In the embodiment, input alphabets are $\{0, 1\}$ and output alphabets are $\{x_1, \ldots, X_9\}$. Under such a condition, a soft decision circuit with 2 inputs and 9 outputs is provided, and a table in which conditional probability $P(x_i|\omega_i)$ contingent on the encode position is provided in the decoding unit 134. A log likelihood function $L(x|\omega)$ is defined by the following Equation (2).

$$L(x_i | \omega) = -\sum_i \log P(x_i | \omega_i) \qquad (2)$$

The conditional probability $P(x_i|\omega_i)$ can be set in advance depending on the encode position in the medium block in consideration of, for example, a block at the corner of the medium block, a relation between a block size and a main-scanning pitch or a sub-scanning pitch, and compression scheme, and can be stored as a lookup table in the RAM or the ROM. Then, a log likelihood, that is, $\log P(x_i|\omega_i)$ is considered as a branch value of a trellis diagram, a path that minimizes the log likelihood is calculated, and a code word corresponding to the encode position on the path corresponding to the minimized log likelihood is set as an error correction value at the encode position corresponding to the decoding error.

As a simpler error correction decoding, in the example in which the decoding process is preformed for each partial information, the error correction processing can be performed in such a manner that a sequence of code words obtained for a specific block to be subjected to the decoding process in the partial information is regarded as the error correction code, and when the decoding error is detected, a code word detected larger number of times than the occurrence probability set for the block is set as the error correction value for the block. The error-correction decoding process used in this example is disclosed in, for example, Imai, Electronics, Information and Communication Lecture Series C-1, Theories of information, code, and encode, Institute of Electronics, Information and Communication Engineer, CORONA PUBLISHING CO., LTD, 2005, 9.

Figure 7:
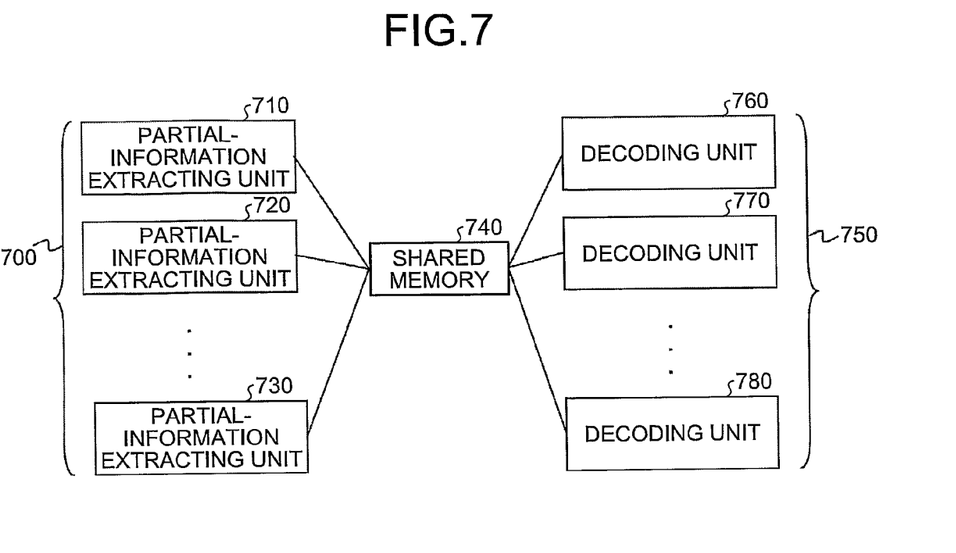
FIG. 7 is a block diagram of a modified example of the embedded-information detecting apparatus according to the embodiment.

FIG. 7 is a block diagram of a modified example of the embedded-information detecting apparatus 100. The embedded-information detecting apparatus 100 shown in FIG. 7 includes a partial-information extracting unit sequence 700. The partial-information extracting unit sequence 700 includes a plurality of partial-information extracting units 710 to 730. The partial-information extracting units 710 to 730 can be set as appropriate depending on the number of bits corresponding to a matrix of an image to be processed. For example, if partial information is acquired over the whole width in a lateral direction or the whole length in a longitudinal direction, the partial information is acquired in units of longitudinal lines or in units of lateral lines in such a manner that pieces of partial information is skipped to one another in units of block widths in the lateral direction or in the longitudinal direction so that the pieces of partial information can be acquired in parallel to each other. As another example, if hardware resources are sufficient, as many the partial-information extracting units as being capable of cover the entire area of an image are provided so that all pieces of the partial information of the image can be acquired at once. Each of the partial-information extracting units 710 to 730 extracts the specified number of pieces of the partial information in parallel according to the predetermined number of bits in a matrix or the like, and writes the extracted information in each address area allocated in a shared memory 740.

The embedded-information detecting apparatus 100 also includes a decoding unit sequence 750. The decoding unit sequence 750 includes decoding units 760 to 780. Each of the decoding units 760, 770, and 780 reads data of the partial information from the address area used for the processing in the shared memory 740, and performs processing in parallel. The efficiency of the parallel processing can be maximized when the number of the partial-information extracting units 710 to 730 and the number of the decoding units 760 to 780 are set to be equal to each other. In the example shown in FIG. 7, the shared memory 740 need not be configured as a FIFO buffer and the like as long as the shared memory 740 can be accessed in parallel, and the configuration thereof can be appropriately selected in consideration of only read access speed and write access speed.

Figure 8:
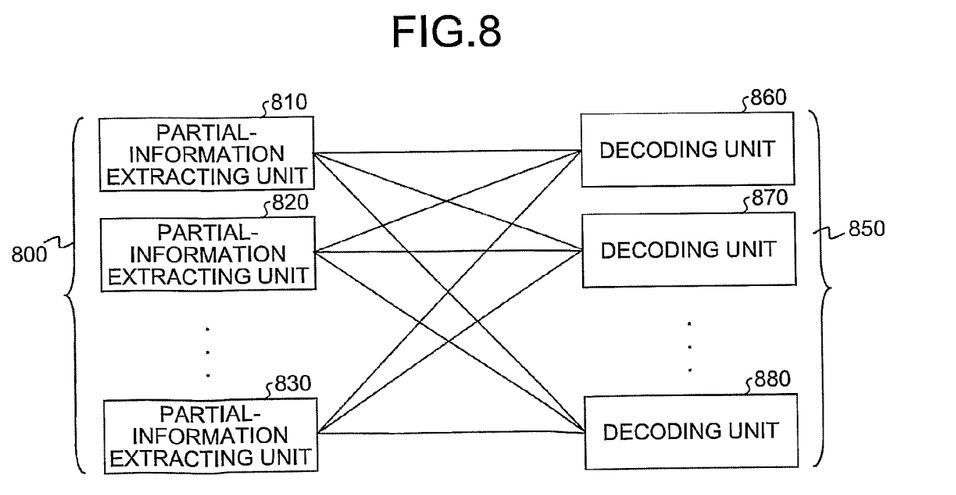
FIG. 8 is a block diagram of another modified example of the embedded-information detecting apparatus according to the embodiment.

FIG. 8 is a block diagram of another modified example of the embedded-information detecting apparatus 100. The embedded-information detecting apparatus 100 shown in FIG. 8 includes a partial-information extracting unit sequence 800 and a decoding unit sequence 850, but does not include a component corresponding to the shared memory 120 and the shared memory 740. Partial-information extracting units 810 to 830 can be set as appropriate, similar to the example shown in FIG. 7, depending on an image to be processed.

The decoding unit sequence 850 of the embedded-information detecting apparatus 100 is, in this example, includes decoding units corresponding to the number of blocks contained in the partial information. Each of decoding units 860 to 880 acquires specific block information among partial information extracted by each of the partial-information extracting units 810 to 830, and performs the decoding process. For example, it is possible to configure the decoding unit 860 to exclusively perform processing on block information corresponding to the encode position (i=1) and the decoding unit 870 to exclusively perform processing on block information corresponding to the encode position (i=2). As still another example, it is possible to allow each of the decoding units to perform processing on pieces of block information corresponding to a plurality of encode positions. In this case, it is preferable to provide a proper buffer memory. In the example shown in FIG. 8, performance of the processing of acquiring the partial information and performance of the parallel processing in the decoding process can be improved, so that the decoding process can be performed more efficiently.

Furthermore, in the embedded-information detecting apparatus 100 according to this example, various methods of modulation codes can be applied instead of use of increase and decrease in brightness values. For example, a method in which image bits are transformed through Fourier transformation and spatial frequency characteristic is increased or decreased for each block, or a method in which a block is replaced by a pattern in a specific shape can be used. If such methods can be used for the modulation, frequency information obtained from each block, or pattern information can be registered in the shared memory 120 and the shared memory 740 instead of the average of the brightness values.

For decoding the registered characteristic information, statistical processing is performed on characteristic values of the extracted information for blocks in the medium block and at the same encode positions, and processing is performed to identify a code word to either 0 or 1 or determining an identification error based on the value obtained through the statistical processing. If the log likelihood is used as the characteristic information when the error-correction decoding process is performed, the statistical processing on the characteristic value can be performed by addition or deletion of the log likelihood of each block.

The embedded-information detecting apparatus according to the embodiment can be applied to multimedia content as a complex of audio, video, and text, instead of the still image in such a manner that embedded information is embedded in the content in units of time for the audio, in units of frames for the video, and in units of constituent elements for the text, so that the embedded information can be redundantly recorded. As a result, the reliability of the embedded information can be enhanced and the embedded information can be detected at increased processing speed and with increased efficiency.

Figure 9:
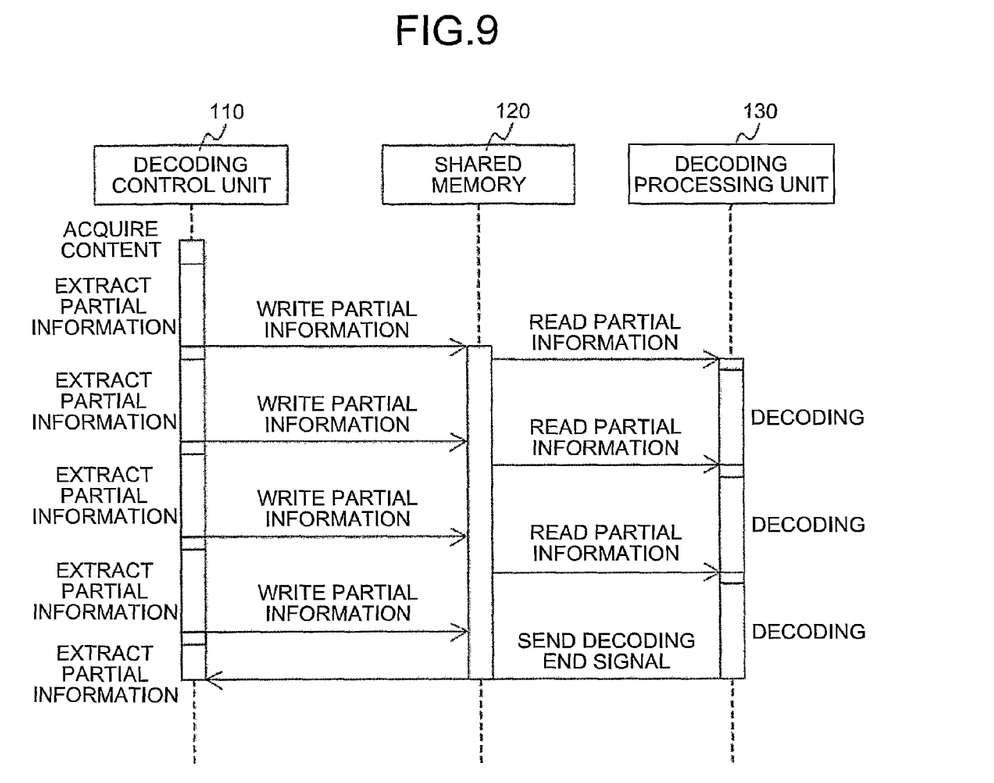
FIG. 9 is a schematic diagram for explaining parallel processing performed by the embedded-information detecting apparatus according to the embodiment.

FIG. 9 is a schematic diagram for explaining parallel processing performed by the embedded-information detecting apparatus 100 according to the embodiment. The parallel processing performed by the decoding control unit 110 and the decoding processing unit 130 is described below with reference to FIG. 9.

The decoding control unit 110 acquires the content 102 and extracts partial information. When the extraction of the partial information is completed, the decoding control unit 110 writes the partial information in the shared memory 120. The decoding control unit 110 repeatedly performs the extraction process of the partial information until it receives the decoding end signal.

Meanwhile, the decoding processing unit 130 sequentially reads partial information in order of arrival of the partial information in the shared memory 120, and performs the decoding process on the partial information. The decoding processing unit 130 repeatedly performs the decoding process until the decoding process is successfully performed on the partial information. The decoding processing unit 130 performs the decoding process independent of the extraction processing performed by the decoding control unit 110.

When decoding of the partial information has been successfully performed in the decoding process, the decoding processing unit 130 sends the decoding end signal to the decoding control unit 110 via the shared memory 120, outputs the extracted information, and ends the decoding process.

Upon receiving the decoding end signal, the decoding control unit 110 ends the extraction processing being performed on the partial information. In this manner, in the embodiment, when the decoding processing unit 130 has successfully decoded a code word, the decoding control unit 110 and the decoding processing unit 130 are synchronized with each other to end the detection process of the embedded information. If the decoding control unit 110 does not receive the decoding end signal for a predetermined time after the decoding control unit 110 completes extraction of all pieces of partial information, the decoding control unit 110 determines that the decoding process has not been successfully performed, and operations of the decoding control unit 110 and the decoding processing unit 130 are terminated.

The functions described in the embodiment can be implemented by computer-executable programs written in legacy program language such as assembler, C, C++, Java (registered trademark), Java (registered trademark) script, Perl, and Ruby, or object-oriented program language. The computer programs according to the embodiment can be stored in a computer-readable recording medium such as a hard disk drive, a CD-ROM, an MO disk, a flexible disk, an EEPROM, and an EPROM for distribution, or can be distributed in any computer-readable formats from other apparatuses via a network.

As described above, according to one aspect of the present invention, detection efficiency of embedded information redundantly recorded in a processing object can be improved, and therefore, successive processing using the embedded information can be efficiently performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An apparatus for detecting embedded information redundantly embedded in a content, the apparatus comprising:
    a control unit that extracts partial information containing the embedded information from a partial area of the content, and controls decoding of the embedded information; and
    a decoding unit that performs a decoding process of decoding a plurality of code words contained in the embedded information from the partial information, wherein
    when the decoding process is successfully performed, the decoding unit notifies the control unit of completion of the decoding process so that each of the control unit and the decoding unit perform a parallel processing in an asynchronous manner, and
    the control unit
        repeatedly extracts the partial information and,
        whenever having extracted partial information, sends the extracted partial information to the decoding unit until the decoding process is successfully performed.

2. The apparatus according to claim 1, wherein a plurality of pieces of partial information extracted by the control unit includes identical embedded information.

3. The apparatus according to claim 2, wherein the decoding unit decodes the code words by performing a statistical processing on the pieces of partial information.

4. The apparatus according to claim 3, wherein the decoding unit decodes the code words by calculating an integrated characteristic amount by taking a moving average of characteristic amounts extracted from the pieces of partial information and comparing the integrated characteristic amount with a predetermined threshold.

5. The apparatus according to claim 3, wherein the decoding unit decodes the code words by successively comparing characteristic amounts extracted from the pieces of partial information with a predetermined threshold, and determines a code word to be decoded by performing a statistical processing on a sequence of code words acquired for the pieces of the partial information.

6. The apparatus according to claim 4, wherein the decoding unit estimates the code words by performing either one of an error correction using an encode position of the embedded information embedded in the partial information as an error correction code and an error correction using a sequence of code words acquired for the pieces of the partial information as the error correction code.

7. A method of detecting embedded information redundantly embedded in a content, the method comprising:
    first extracting including extracting partial information containing the embedded information from a partial area of the content;
    first decoding including performing a decoding process of decoding a plurality of code words contained in the embedded information from the partial information;
    second extracting including repeatedly extracting the partial information containing identical embedded information until the decoding process is successfully performed;
    second decoding including decoding, when a plurality of pieces of partial information is extracted at the second extracting, code words by performing a statistical processing on the pieces of partial information;
    notifying completion of the decoding process when the code words are successfully decoded; and
    performing a parallel processing of a process of extracting the partial information and the decoding process in an asynchronous manner.

8. The method according to claim 7, wherein the first decoding includes estimating the code words by performing either one of an error correction using an encode position of the embedded information embedded in the partial information as an error correction code and an error correction using a sequence of code words acquired for the pieces of the partial information as the error correction code.

9. A nontransitory computer-readable medium having computer-readable program codes embodied in the medium for detecting embedded information redundantly embedded in a content, the program codes when executed causing a computer to execute:
    first extracting including extracting partial information containing the embedded information from a partial area of the content;
    first decoding including performing a decoding process of decoding a plurality of code words contained in the embedded information from the partial information;
    second extracting including repeatedly extracting the partial information containing identical embedded information until the decoding process is successfully performed;
    second decoding including decoding, when a plurality of pieces of partial information is extracted at the second extracting, code words by performing a statistical processing on the pieces of partial information;
    notifying completion of the decoding process when the code words are successfully decoded; and performing a parallel processing of a process of extracting the partial information and the decoding process in an asynchronous manner.

10. The nontransitory computer readable medium according to claim 9, wherein the first decoding includes estimating the code words by performing either one of an error correction using an encode position of the embedded information embedded in the partial information as an error correction code and an error correction using a sequence of code words acquired for the pieces of the partial information as the error correction code.

* * * * *